1,873,418

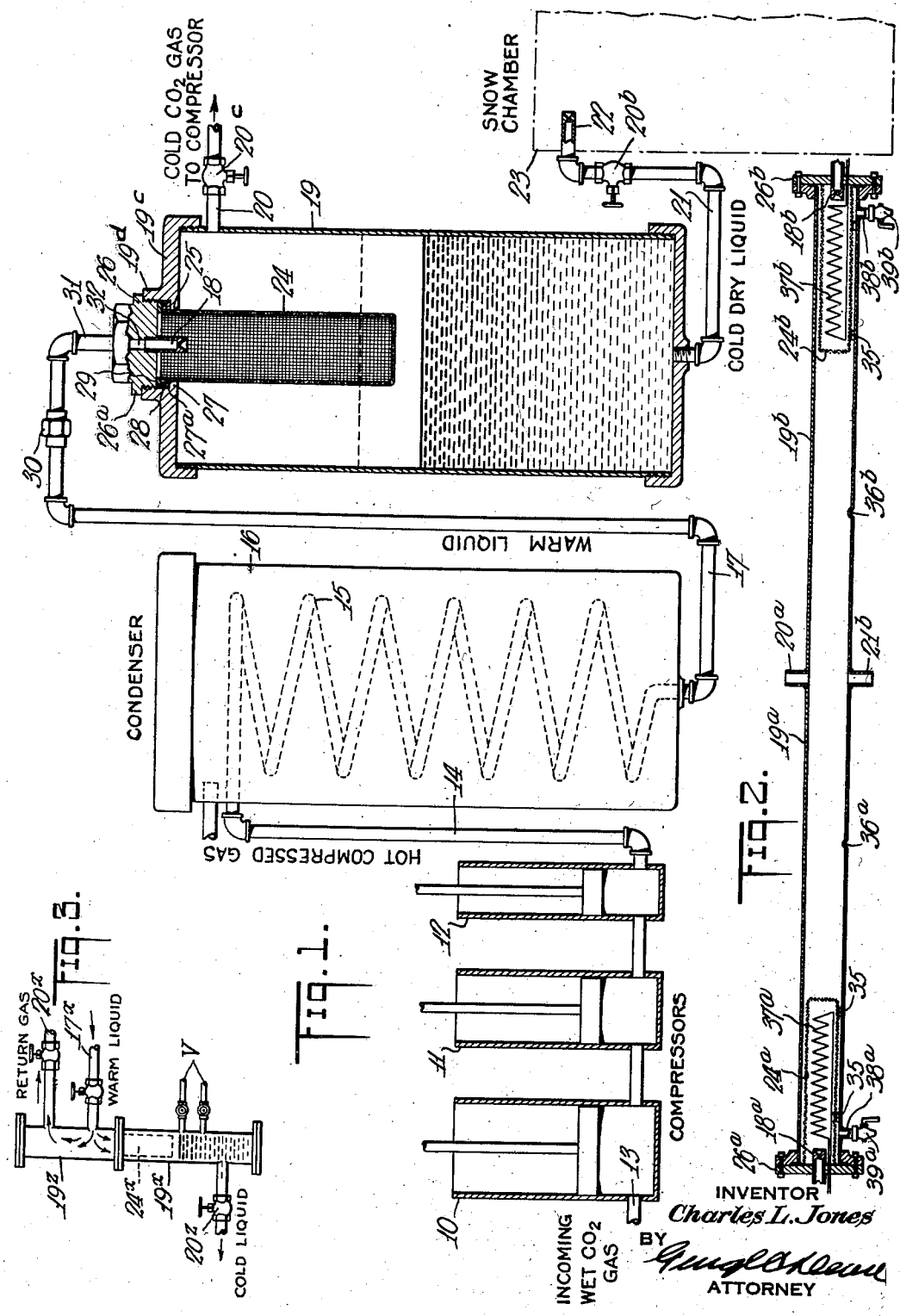
Aug. 23, 1932.     C. L. JONES     1,873,418
METHOD AND APPARATUS FOR MAKING DRY CARBON DIOXIDE PRODUCTS
Filed Feb. 21, 1929
INVENTOR
*Charles L. Jones*
BY
ATTORNEY Patented Aug. 23, 1932

UNITED STATES PATENT OFFICE

CHARLES L. JONES, OF PITTSBURGH, PENNSYLVANIA, ASSIGNOR TO DRYICE CORPORATION OF AMERICA, OF NEW YORK, N. Y., A CORPORATION OF DELAWARE

METHOD AND APPARATUS FOR MAKING DRY CARBON DIOXIDE PRODUCTS

Application filed February 21, 1929. Serial No. 341,680.

My present invention was made primarily as a solution of certain problems in the making of solid carbon dioxide from liquid by the well known snow making method, that is, by discharging of the liquid through a constricted nozzle permitting release and sudden expansion of the liquid from its primary pressure and temperature of liquefaction. As is well known, the expansion results in freezing a part of the carbon dioxide to snow while the remainder escapes as gas which may be returned and recompressed to make additional liquid or otherwise employed, as may be desired.

The liquid carbon dioxide has always contained appreciable percentages of water and as the snow nozzle and liquid discharged therethrough quickly acquire a temperature of approximately 110° or more below zero, great difficulty results from frozen water clogging the jet, entailing excessive delays and loss of the product, while the jet is being thawed out. Even if no clogging occurs, the commercial product, the compressed snow block, contains substantially all the water that was in the liquid. If this is a substantial percentage of the block, the insulating value of the refrigerant gas that sublimates from the block, will be correspondingly less and the moisture is otherwise objectionable in certain uses to which the solid carbon dioxide may be put.

My invention has for its object a simple, cheap and remarkably effective method of removing substantially all of the water and other liquid impurities from the liquid carbon dioxide. Consequently, it may be used for the production of dry liquid carbon dioxide regardless of the purpose for which the liquid is used. It involves cooling the liquid, preferably by a partial release of pressure thereon, to freeze the water, and novel means for collecting, or so to speak precipitating, the frozen crystals, segregated from the liquid. The partial expansion results incidentally in the production of dry carbon dioxide gas which heretofore has been an expensive product producible only by special chemical driers. This product may be returned to the primary compressors that make the liquid, it may be passed on to independent compressors to make dry liquid for storage tank use, for any of the purposes in connection with which the dry liquid has commercial value, as for instance, in mechanical refrigerating apparatus, wherein the refrigeration is by means of alternate compression and expansion of carbon dioxide.

While the normal freezing point of water is 32° F., I have discovered that when the customary relatively small percentages of it are diffused throughout relatively large volumes of the liquid carbon dioxide, in an almost molecular state of subdivision, it can be sub-cooled far below the freezing point without crystallizing out unless suitable opportunity for agglomeration is afforded. I have found in practice that if liquid carbon dioxide from the compressors, usually at a temperature not much below critical temperature, usually as high as 70° to 80° F., and at corresponding pressure, say 800 to 1200 pounds per square inch, has to be expanded for freezing out of the water, a very considerable pressure drop is necessary to afford the required expansion and reduction of temperature. Where the liquid is being expanded and cooled preparatory to use in snow making apparatus, a drop to 300 pounds pressure affording a corresponding temperature drop to approximately zero F. suitable for my drying method and even greater expansion and temperature drop may be employed, because for carbon dioxide snow making purposes, a very low temperature for the liquid delivered to the jet will result in a high percentage yield of snow product.

However, where the method is applied merely to making of dry liquid carbon dioxide for other purposes, excessive pressure drop represents waste and much higher temperatures will be found practicable. Where the liquid is to be used for mechanical refrigeration, the freezing out temperature should be low enough to take out practically all of the water, as in the case of snow making.

It must be understood that while the pressure drop may vary considerably and the resultant liquid temperature may vary within a considerable range, the pressure on the liquid at the low pressure side of the nozzle should be high enough to prevent freezing of the carbon dioxide at this point and the incoming stream of liquid $CO_2$ must be warm enough to prevent the water from freezing within the nozzle.

These conditions are usually easily attainable in an expansion nozzle such as may be used to pre-cool warm, freshly-compressed liquid $CO_2$ by partial evaporation on its way to a final snow making nozzle.

As suggested above, sub-cooling of the water content, or even freezing out of the minute water ice crystals must be accompanied by their collection to be effective, as otherwise such water will flow with the liquid through relatively small passages to the snow making nozzle or deposit on and obstruct the flow passage walls. Such minutely diffused ice particles or sub-cooled water will not readily agglomerate or precipitate out of the liquid unless they are brought into intimate relation with each other or to a cold surface to which they may cling. In the present case, I actually strain the liquid and build up an agglomeration of fluffy water ice snow in the strainer, which may be periodically removed and emptied.

This strainer, collector or precipitator is preferably arranged at the nozzle where the cooling pressure drop occurs, preferably surround it but at sufficient distance to permit dissipation of the violence of the jet before the screen is reached. It may even be arranged as a trap at a suitable point between the primary expansion nozzle and the restricted passageways which the liquid is subsequently caused to traverse.

The above and other features of my invention will be more evident from the following description in connection with the accompanying drawing, in which Figure 1 is a more or less diagrammatic view of the apparatus for producing and precipitating the water crystals from the liquid carbon dioxide, interposed between the liquid making compressors and the liquid using apparatus, as, for instance, a nozzle of the snow making type.

Fig. 2 is a longitudinal section showing a modification.

Fig. 3 is a diagram of another modification.

For simplicity and convenience of illustration, I have not attempted to show correct sizes, or structural details for the various pieces of apparatus shown in the drawing. The approximate pressures and temperatures above and hereinafter mentioned are suitable for commercial snow making practice and of course subject to material variation within the spirit of the invention, as will be readily understood.

Fairly cool low pressure $CO_2$ gas containing the usual amount of fluid impurities (principally water) enters the triple stage compressor 10, 11, 12 through the pipe 13. It is forced in highly heated and compressed condition through pipe 14 to the cooling coil 15 of the condenser 16 and from this coil the liquefied $CO_2$ flows through a low resistance pipe 17 to the expansion nozzle 18 which discharges into the evaporator 19. The liquid when it reaches the nozzle may be at a pressure say of 1,000 pounds per square inch and at a temperature of around 80° F.

The evaporator is in the nature of an upright tank having a gas outlet pipe 20 near its top and a liquid outlet pipe 21 in its bottom through which the liquid, substantially pre-cooled by the sudden release of pressure at nozzle 18 and partial evaporation in tank 19, flows to second and third stage evaporators (not shown) or direct to the liquid using apparatus, such for instance, as the expansion nozzle 22 of a snow chamber shown in dotted lines at 23.

A back pressure of say, 300 pounds per square inch is maintained in the evaporator tank 19 as by an adjustable valve 20c in the gas escape line 20 or by running said line back to the inlet side of the third stage compressor, or in any other manner. A control valve 20b may also be arranged in the liquid outlet line.

In some cases it may be desirable to segregate the dry gas leaving the evaporator from the wet gas handled by the compressors, and it will be understood that many expedients may be resorted to for maintaining the desired pressure in the evaporator and for handling the gas escaping through pipe 20.

The primary expansion nozzle may be of the conventional snow making type, but operating at pressures too high for making $CO_2$ snow and other details of the apparatus, as thus far described, may be conventional, the present invention being more particularly concerned with the extraction of the moisture from the warm and liquid carbon dioxide supplied to the evaporator, and the consequent delivery of substantially dry liquid to the liquid using apparatus and dry gas to any desired point.

With this in view, I employ a strainer or precipitator, here shown as a fine mesh basket 24 within which nozzle 18 discharges and through which the expanded and cooled $CO_2$ must pass on its way to the gas or liquid outlet as the case may be. The drawing shows one simple manner of removably securing this basket in place, but it will be obvious that numerous other means may be employed for the purpose.

The fairly massive upper head 19c of the evaporator tank 19 is provided with an opening 25 the upper portion of which is threaded to receive the lower threaded end of a closure plug 26. This plug has a flange 26a seating gas-tight on a boss 19d encircling the opening 19a. The lower or inner end of this opening defines a support annulus 27 carrying gasket 27a upon which an outwardly extending flange 28 of the basket rim is adapted to rest, this flange being firmly clamped against the shoulder by a gasket 29 carried or forced home by the plug 26 as the latter is screwed into place.

The pipe line 17 may include a horizontal section removably coupled at 30 to the terminal elbow section 31, the vertical portion of the latter being coupled in leak-proof manner to the vertical passageway 32 in the plug which communicates with the nozzle 18. The latter in this instance is carried by the closure plug and fitted into the enlarged lower end of bore 32.

The material of the basket must be such that a rather fine straining effect is obtained. 40 mesh wire gauze of Monel metal has proved suitable in practice, but any foraminous, reticulated material might be used and a canvas bag may be employed as a substitute or in addition to the wire gauze and may be either inside or outside the latter.

In operation, the warm liquid discharges with great violence in the nozzle 18, but it expands and partly gasifies to produce maximum cooling effect within a fraction of an inch of the outlet and the net refrigerant effect on the liquid produces a temperature drop to somewhat below the freezing point of water, say to around zero Fahrenheit. The violence of the expansion is quickly dissipated in a region quite close to the nozzle mouth so that the inflowing and expanding gas does not strike the screen with sufficient force to break up the ice crystals deposited in its interior and does not force them through the screen into the tank. Water, the principal liquid impurity, which has been carried along by the $CO_2$ stream in an almost molecular state of subdivision, will immediately be crystallized out, the water ice crystals depositing on the inner surface of basket 24 in the form of a fine, fluffy snow containing, when the basket is full, some entrapped $CO_2$ gas.

To remove the basket and empty it, the coupling 30 is unscrewed and the closure plug 26 is unscrewed and removed together with pipe line section 31 which it carries. The basket is then lifted out. Prior to these operations the pressure in the evaporator has of course been reduced to substantially atmospheric by a temporary cessation of the otherwise continuous processing of the $CO_2$.

While I have shown a strainer for the purpose, the invention in its broader aspect contemplates the provision of any collector surface over which the liquid is caused to flow in intimate relation so that the ice crystals will be collected thereon.

Whether the liquid level in the evaporator tank is below the basket as shown or whether it rises to a level where the basket is partially submerged as indicated in dotted lines seems to be of no special moment in so far as the efficiency of the drying process is concerned.

As before explained, the invention in its broader aspects would contemplate employing the compressor of an ordinary mechanical refrigeration system as the source of the highly compressed carbon dioxide and the refrigerator coil of such system as the device to which the dried carbon dioxide is supplied for its final expansion.

In Fig. 2 I have shown a modified expansion chamber adapted for expansion and cooling purposes. In this case the essential elements are functionally similar to those of the cooling, drying chamber 19 of Fig. 1, and accordingly similar reference characters with different exponents are used in Fig. 2. In this latter figure, the expansion chamber 19a, 19b is a horizontal tube and the ends of the tube are equipped with symmetrically arranged expansion nozzles 18a, 18b, fine mesh screens 24a, 24b, and removable end closures 26a, 26b. Preferably, there is only one high level gas outlet, 20a, and one low level liquid outlet, 21b. The screens being horizontal are preferably provided with lateral supporting legs or brackets 35, 35.

The device of Fig. 2 has better arrangements for the removal of the snow collected in basket 24a and for gravity retention of water, either liquid or crystal, so that it does not naturally and necessarily fall into the body of liquid $CO_2$, particularly when the strainer is cleaned. The expansion chamber being horizontal, dams 36a, 36b, which may be in the form of bunkers or indentations, are arranged between the freezing out region and the liquid and gas discharge region of the chamber. They are particularly necessary in the present case by reason of the further provision of means for melting the collected crystals in the basket and drawing the water off as liquid instead of attempting to remove crystals from the basket. The means is diagrammatically indicated as being electrical heating coils 37a, 37b. These heaters are diagrammatically indicated as disposed within the basket, but it is obvious that they might surround the same or might even be exterior to the container walls 19a, 19b. However, enamel insulated resistance wire could be used substantially as shown.

With this arrangement, the expansion jets may be operated either simultaneously or alternately and either one of them may be discontinued and the crystals melted out from the basket at any time without interference with the operation of the other. Either jet being turned off and the heater turned on, the water ice crystals are melted to water, which is restrained by dams 36a, 36b from flowing to the outlet for the liquid $CO_2$. The water drains downward through outlets 38a, 38b, which may lead to traps not shown or may simply be blown through cocks 39a, 39b.

The dry gas passing off through 20a and the dry liquid flowing down through 21b may both be disposed of in any of the ways described in connection with conduits 20, 21 of Fig. 1.

While sizes are not the essence of the invention, a convenient proportion for quantity production may approximate the following: Chamber 19b, 19c, an extra strong steel pipe, say 8 inches internal diameter, with very heavy walls, say 15 feet long, to withstand pressures preferably approximating the maximum pressure of the source of the liquid $CO_2$, although the working pressure may be approximately 300 pounds per square inch as indicated above. The gas and liquid outlet pipes 20a, 21b, may be 2½ inch pipes of corresponding strength, preferably strip welded in the walls of the expansion chamber.

The screen baskets may be approximately two feet, six inches long by six inches diameter. The dams 36a, 36b may be ½ inch or so in height. The expansion nozzles may be of the sizes and constructions commonly used for making $CO_2$ snow.

However, conventional snow nozzles are not necessary for inlet of the liquid, and it is not necessary that the liquid be discharged in a jet within the basket. Furthermore, it is not necessary to have the evaporating gas pass through the screen mesh of the basket and there are distinct advantages in not having it do so, because if the discharge is rapid or of great velocity, it may tend to carry ice crystals through the screen which would never be carried through by the slower percolation of the liquid.

Fig. 3 is a diagram showing an apparatus having all three of these modifications. In the apparatus actually used, there was an upright pipe 19x corresponding to the tank 19 of Fig. 1, in which was suspended a basket 24x corresponding to 24 but of larger diameter and in proportion to the diameter of the tank. The latter is closed in at the bottom by a header which may be bolted on and the top instead of being flat has, bolted on, an upward extension 19z, and the warm liquid is discharged in this extension at a level considerably above the top of the basket. The outlet pipe 20x, for escape of the cold gas, is located above the inlet for the liquid, the latter being thus a substantial distance above the basket and below the gas outlet. Thus, the gas jet velocities do not interfere with the building up of the porous crystalline water deposits on the interior of the basket. It is to be noted in this connection that even though the basket be of 40 mesh wire and surrounded by canvas, the crystalline frost structure that is built up on the inside of the basket becomes in effect a filter or screen of far finer mesh than said screen or cloth.

Fig. 3 also shows that the tank 19 or 19x may be provided with a series of taps v, at different levels, as a convenient means for testing the level of the liquid carbon dioxide within the tank. If any of these cocks are below the level of the liquid opening, they will cause a carbon dioxide snow blast, whereas if they are above the level of the liquid, only cold gas will escape.

The purifying method herein set forth will be found of particular advantage in connection with carbon dioxide derived from fermentation which, in addition to water, carries other impurities, particularly those imparting the stale odor of fermentation. Those impurities are very difficult as well as expensive to get rid of by ordinary methods, but by my method, practically all of the water and the less volatile and water soluble impurities will be frozen out in the snow basket and even if further purification is necessary, treatment of the dry, cold liquid with chemicals, charcoal, etc., will be relatively easy and inexpensive because of the relatively small amount of the remnant impurity and the corresponding consumption of purifying materials.

What I claim is:

1. A method of removing water from liquid carbon dioxide which includes the steps of suddenly partially relieving the pressure on the liquid carbon dioxide by discharge through a nozzle of snow-forming type to vaporize part of the carbon dioxide and bring the liquid to a pressure and correlative temperature much below freezing of water but above the triple point of the carbon dioxide and bringing the cooled liquid into intimate relation with a suitable surface arranged to collect the water as frozen out crystals.

2. A method of removing water and the like from liquid carbon dioxide which includes the steps of causing expansion and partial vaporization of the liquid carbon dioxide, sufficient to cool the liquid substantially below the freezing point of the water but limiting said cooling to a point substantially above the freezing point of the carbon dioxide liquid, and straining the minute crystals of frozen out impurities from the cooled liquid.

3. A method of removing high freezing point fluid impurities from highly compressed liquid carbon dioxide which includes the steps of relieving the pressure on the carbon dioxide and its entrained impurities to vaporize part of the carbon dioxide to cool it substantially below the freezing point of the impurities but substantially above the freezing point of the carbon dioxide, and straining the minute crystals of frozen impurities from the cooled carbon dioxide.

4. A method of removing high freezing point fluid impurities from highly compressed carbon dioxide which includes the steps of cooling the carbon dioxide with its entrained impurities much below the freezing point of the impurities but above the freezing point of the carbon dioxide, and bringing the cooled carbon dioxide into intimate proximity with a surface upon which the crystals of frozen out impurities are collected.

5. A method of removing water from liquid carbon dioxide which includes the steps of suddenly partially relieving the pressure on the liquid carbon dioxide and cooling the liquid to the crystallizing temperature of the entrained water, and straining the cold liquid to remove the water in the form of ice crystals.

6. A method of producing dry liquid carbon dioxide which includes the steps of suddenly expanding the liquid to cool it to a temperature below the freezing point of water in order to crystallize the water content of the carbon dioxide and straining the water ice crystals out of the cold liquid carbon dioxide.

7. A continuous process of producing dry liquid carbon dioxide for use in snow making which includes the steps of highly compressing carbon dioxide gas, condensing the compressed gas, partially expanding the condensate to lower its temperature below the freezing point of water whereby water impurities are precipitated out in the form of ice crystals and straining the cold liquid to remove the crystals therefrom.

8. A method of simultaneously producing dry liquid carbon dioxide and dry carbon dioxide gas which includes the steps of expanding highly compressed liquid carbon dioxide through a nozzle into an evaporating chamber maintained at such pressure that the carbon dioxide is partially gassified by the expansion and the temperature of the carbon dioxide is reduced to below the freezing point of water, screening both liquid and gaseous carbon dioxide to remove the water ice crystals which are formed and withdrawing the dry gaseous and liquid carbon dioxide products from the evaporator through separate outlets.

9. The method which includes expanding compressed liquid carbon dioxide containing water through successive nozzles of the snow-forming type, the steps including primary expansion to a pressure and temperature low enough to cause solidifying of the water but not low enough to solidify the carbon dioxide followed by screening out of the water in crystal form, and the secondary expansion being to pressures and temperatures suitable for production of solid carbon dioxide from the resulting cold, water-free liquid.

10. Apparatus for drying carbon dioxide including an expansion chamber having a liquid outlet at its lower end and a gas outlet at its upper end, means to maintain the contents of the chamber under pressure, a nozzle for discharging liquid carbon dioxide into the chamber, means to supply liquid carbon dioxide to the nozzle at a pressure considerably above the chamber pressure, and means providing a collector surface upon which the ice crystals frozen out by the expansion and cooling of the carbon dioxide are adapted to precipitate.

11. Apparatus for drying carbon dioxide including an expansion chamber having a low level liquid outlet and a high level gas outlet, means to maintain the contents of the chamber under pressure, a means for discharging liquid carbon dioxide into the chamber, a source of supply of liquid carbon dioxide to the said discharge means at a pressure considerably above the chamber pressure, and means for collecting as ice crystals the water frozen out by the expansion and cooling of the carbon dioxide.

12. Apparatus for drying carbon dioxide including an expansion chamber having a low level liquid outlet and a high level gas outlet, means to maintain the contents of the chamber under pressure, a nozzle for discharging liquid carbon dioxide into the chamber, means to supply liquid carbon dioxide to the nozzle at a pressure considerably above the chamber pressure, and means for collecting as ice crystals the water frozen out by the expansion and cooling of the carbon dioxide, said means comprising a fine mesh strainer spaced apart from the nozzle and interposed between it and said liquid outlet and through which the expanding stream from the nozzle necessarily flows.

13. Apparatus as in claim 12 and wherein the strainer is removable through a closure controlled opening in the chamber.

14. Apparatus as set forth in claim 12 and wherein the nozzle is carried by a closure and the latter upon removal provides clearance for the removal of the strainer.

15. Apparatus for drying carbon dioxide including an expansion chamber having a low level liquid outlet and a high level gas outlet, throttle valves controlling the flow from both outlets to maintain a pressure in the chamber, a nozzle for discharging liquid carbon dioxide into the chamber, means to supply liquid carbon dioxide to the nozzle at a pressure considerably above the chamber pressure, and means for collecting as ice crystals the water frozen out by the expansion and cooling of the carbon dioxide preventing free flow of gas or liquid to the outlets except in streams of very small cross-sectional area.

16. Apparatus for drying carbon dioxide including an expansion chamber having a low level liquid outlet and a high level gas outlet, means to maintain the contents of the chamber under pressure, a nozzle for discharging liquid carbon dioxide into the chamber, means to supply liquid carbon dioxide to the nozzle at a pressure considerably above the chamber pressure, and means for collecting as ice crystals the water frozen out by the expansion and cooling of the carbon dioxide, said collecting means being in the form of a fine mesh basket having walls surrounding but remote from the jet.

17. Apparatus for drying carbon dioxide including an expansion chamber having a low level liquid outlet and a high level gas outlet, means to maintain the contents of the chamber under pressure, a nozzle for discharging liquid carbon dioxide into the chamber, means to supply liquid carbon dioxide to the nozzle at a pressure considerably above the chamber pressure, and means for collecting as ice crystals the water frozen out by the expansion and cooling of the carbon dioxide, said collecting means being in the form of a fine mesh basket having walls surrounding but remote from the jet and elongated in the direction of discharge of the jet from said nozzle so that all fluid flow therethrough will be at relatively low velocity.

18. Apparatus as in claim 17, in combination with means for melting the ice crystals and separately collecting and draining off the water without removing the basket.

19. Apparatus as in claim 17 and wherein the expansion chamber is a long, horizontally disposed tubular element having oppositely-directed, symmetrically disposed expansion nozzles and collecting baskets in opposite ends thereof.

20. Apparatus as in claim 17 and wherein the expansion chamber has a plurality of transversely directed expansion nozzles and collecting baskets each with means for melting ice crystals and for separately collecting and draining off the water.

21. A method of purifying liquid carbon dioxide having therein impurities that freeze above the freezing point of liquid carbon dioxide which comprises, reducing the pressure on the liquid, so that only a portion of it gasifies, to produce a temperature in the other portion of the liquid which is lower than the solidifying point of the impurities therein, limiting said reduction in pressure so that a temperature as low as the solidifying point of the remaining liquid is not reached and then removing the impurities.

22. A method of purifying a body of liquid carbon dioxide which comprises, releasing pressure on the liquid to produce a temperature lower than the solidifying point of the impurities therein, limiting said expansion so that a temperature lower than the solidifying point of the liquid is not reached, retaining the solidified impurities near the point of expansion for subsequent removal of said impurities and allowing the liquid to continue in its circulation.

Signed at New York, in the county of New York and State of New York, this 16th day of February, A. D. 1929.

CHARLES L. JONES.